(12) United States Patent
Bunandar et al.

(10) Patent No.: US 12,174,656 B2
(45) Date of Patent: Dec. 24, 2024

(54) MATRIX MULTIPLICATION USING OPTICAL PROCESSING

(71) Applicant: Lightmatter, Inc., Boston, MA (US)

(72) Inventors: Darius Bunandar, Boston, MA (US); Nicholas C. Harris, Menlo Park, CA (US); Tyler J. Kenney, Boston, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 18/505,602

(22) Filed: Nov. 9, 2023

(65) Prior Publication Data

US 2024/0077904 A1   Mar. 7, 2024
US 2024/0353886 A9   Oct. 24, 2024

Related U.S. Application Data

(63) Continuation of application No. 16/671,726, filed on Nov. 1, 2019, now Pat. No. 11,860,666.

(60) Provisional application No. 62/755,381, filed on Nov. 2, 2018.

(51) Int. Cl.
G06E 3/00      (2006.01)
G02F 3/00      (2006.01)
G06E 1/04      (2006.01)

(52) U.S. Cl.
CPC .............. G06E 3/005 (2013.01); G02F 3/00 (2013.01); G06E 1/045 (2013.01)

(58) Field of Classification Search
CPC ......... G06E 3/005; G06E 1/045; G03E 3/008; G02F 3/00; G06N 3/0675; G06N 3/084
USPC ....................................................... 708/839
See application file for complete search history.

(56) References Cited

U.S. PATENT DOCUMENTS 5,321,639 A * 6/1994 Krishnamoorthy .. G06N 3/0675
                                                            708/7

* cited by examiner

*Primary Examiner* — Tan V Mai
(74) *Attorney, Agent, or Firm* — Wolf, Greenfield & Sacks, P.C.

(57) ABSTRACT

Systems and methods for performing matrix operations using a photonic processor are provided. The photonic processor includes encoders configured to encode a numerical value into an optical signal and optical multiplication devices configured to output an electrical signal proportional to a product of one or more encoded values. The optical multiplication devices include a first input waveguide, a second input waveguide, a coupler circuit coupled to the first input waveguide and the second input waveguide, a first detector and a second detector coupled to the coupler circuit, and a circuit coupled to the first detector and second detector and configured to output a current that is proportional to a product of a first input value and a second input value.

20 Claims, 11 Drawing Sheets

MATRIX MULTIPLICATION USING OPTICAL PROCESSING

RELATED APPLICATIONS

This application claims the benefit under 35 U.S.C. § 120 and is a Continuation of U.S. patent application Ser. No. 16/671,726, filed Nov. 1, 2019, entitled "MATRIX MULTIPLICATION USING OPTICAL PROCESSING," which claims priority under 35 U.S.C. § 119(e) to U.S. Provisional Application Ser. No. 62/755,381, filed Nov. 2, 2018, entitled "MATRIX MULTIPLICATION USING OPTICAL PROCESSING," each of which is incorporated herein by reference in its entirety.

BACKGROUND

Matrices and tensors are multidimensional arrays of numbers, symbols, and/or expressions. Linear operations that involve matrices and tensors are fundamental in many computational algorithms, including deep learning and machine learning. Such linear operations often reuse the same input data multiple times and can be computationally intensive.

BRIEF SUMMARY

Some embodiments are directed to a photonic processor. The photonic processor comprises a plurality of row encoders, each of the plurality of row encoders configured to encode a row value into an optical signal of a plurality of optical signals; a plurality of column encoders, each of the plurality of column encoders configured to encode a column value into a different optical signal of the plurality of optical signals; and a plurality of optical multiplication devices, each of the plurality of optical multiplication devices being coupled to a respective one of the plurality of row encoders and a respective one of the plurality of column encoders. Each of the plurality of optical multiplication devices is configured to output an electrical signal proportional to a product of an encoded row value and an encoded column value.

Some embodiments are directed to a method of performing tensor multiplication using a plurality of optical multiplication devices. The method comprises encoding, using a plurality of row encoders, a row value of a first matrix into an optical signal of a plurality of optical signals; encoding, using a plurality of column encoders, a column value of a second matrix into a different optical signal of the plurality of optical signals; and outputting, from each optical multiplication device of the plurality of optical multiplication devices, an electrical signal that represents a product of the respective row value and the respective column value.

Some embodiments are directed to at least one non-transitory computer-readable medium comprising instructions, which, when executed by an at least one photonic processor, cause the photonic processor to perform a method. The method comprises encoding, using a plurality of row encoders, a row value of a first matrix into an optical signal of a plurality of optical signals; encoding, using a plurality of column encoders, a column value of a second matrix into a different optical signal of the plurality of optical signals; and outputting, from each optical multiplication device of the plurality of optical multiplication devices, an electrical signal that represents an outer product of the respective row value and the respective column value.

Some embodiments are directed to a method of manufacturing a photonic processor. The method comprises providing a plurality of row encoders, each of the plurality of row encoders configured to encode a row value into an optical signal of a plurality of optical signals; providing a plurality of column encoders, each of the plurality of column encoders configured to encode a column value into a different optical signal of the plurality of optical signals; and providing a plurality of optical multiplication devices, each of the plurality of optical multiplication devices being coupled to a respective one of the plurality of row encoders and a respective one of the plurality of column encoders. Each of the plurality of optical multiplication devices is configured to output an electrical signal proportional to a product of an encoded row value and an encoded column value.

Some embodiments are directed to an optical multiplication device. The optical multiplication device comprises a first input waveguide configured to receive a first optical signal, the first optical signal comprising a first value; a second input waveguide configured to receive a second optical signal, the second optical signal comprising a second value; a coupler circuit coupled to the first input waveguide and the second input waveguide and configured to output a first mixed optical signal and a second mixed optical signal by mixing the first optical signal and the second optical signal; a first detector coupled to the coupler circuit and configured to output a first electrical signal based on the first mixed optical signal; a second detector coupled to the coupler circuit and configured to output a second electrical signal based on the second mixed optical signal; and a circuit coupled to the first detector and second detector and configured to output a current that is proportional to a product of the first value and the second value based on the first electrical signal and the second electrical signal.

Some embodiments are directed to a method of performing an outer product operation using a plurality of optical multiplication devices. The method comprises encoding, using a plurality of first encoders, values of a column vector into a first plurality of optical signals; encoding, using a plurality of second encoders, values of a row vector into a second plurality of optical signals; and outputting, from each of the plurality of optical multiplication devices coupled to the plurality of first encoders and the plurality of second encoders, an electrical signal that represents an outer product of the column vector and the row vector.

Some embodiments are directed to a method of performing matrix-matrix and/or tensor multiplication operations using a plurality of optical multiplication devices. The method comprises, for each clock cycle of a plurality of clock cycles: encoding, using a plurality of first encoders, a column of a first matrix into a first plurality of optical signals; encoding, using a plurality of second encoders, a row of a second matrix into a second plurality of optical signals; and outputting, from the plurality of optical multiplication devices coupled to the plurality of first encoders and the plurality of second encoders, electrical signals that represent a matrix comprising an outer product of the column and the row. The method further comprises summing the output electrical signals to produce a result representing a multiplication of the first matrix and the second matrix; and outputting the result.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
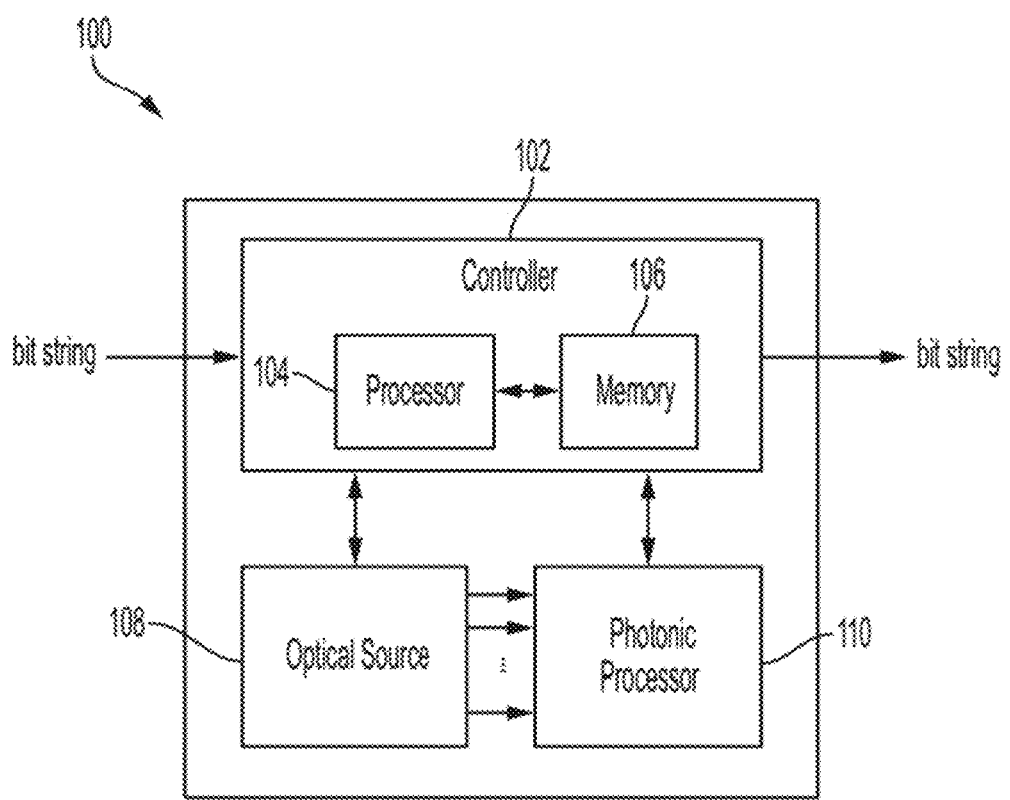
FIG. 1 is a schematic diagram illustrating an example of a photonic processing system, in accordance with some embodiments of the technology described herein.

In electronics, tensor operations may be performed conventionally using, for example, a graphics processing unit (GPU) or a systolic array (e.g. Google Tensor Processing Unit or Cadence Tensilica). In a GPU, a massive number of threads are instantiated to perform a large number of multiply and accumulate operations. Each input data element is copied several times and fed into different registers to speed up the process. The advantage of this highly large parallelism is apparent in computer graphical processing, where the value of each pixel is obtained by performing small matrix multiplications.

To perform tensor operations, systolic arrays make use of a 2D array of electronic multiply-accumulators (MACs), where each MAC accumulates one element of the tensor multiplication. At each clock cycle, data from both matrices are input into the array. The partial products are accumulated at each processor and are also copied to the neighboring processors. Systolic arrays are suitable for large tensor multiplications. To multiply two N×N matrices, systolic arrays have a latency commensurate with one dimension of the systolic array (e.g., O(N)).

Some optical matrix multiplication architectures have been proposed that rely on free space optical systems. They typically spread the input data using imaging optics, e.g. a lens or a prism. The spread-out data are propagated through a 2-D array of electro-optic or acousto-optic cells (e.g. a spatial light modulator (SLM)) which multiply the data by the appropriate matrix values. The resulting transformed data are then focused into an image plane and are read using an array of detectors, where each detector corresponds to a single output element of the tensor operations. Each detector accumulates all light (and hence all multiplied data) arriving there.

The inventors have recognized and appreciated that performing tensor multiplication using optical beams and free-space optics (e.g., refractive and diffractive optics) is complicated by the difficulty of maintaining phase stability of the optical beams in free-space. The phase of each optical beam should be maintained to produce the correct result of the multiplication. Accordingly, the inventors have recognized and appreciated that optical tensor multiplication may be performed using a phase-stable chip-based architecture.

In conventional electronics, while each processor in a GPU and/or systolic array is efficient in performing the multiply-accumulate operation in a tensor multiplication, the data has to travel through the chip to complete the multiplication operations. The inventors have further recognized and appreciated that this on-chip data movement requires significant electrical power because of the need for charging and discharging of capacitive metal wires. Accordingly, the inventors have recognized and appreciated that using light to move data requires zero or nearly zero electrical power, as light propagates without much loss in an optical waveguide. Currently, a typical optical waveguide in silicon photonics can propagate light with loss much smaller than 2 dB/cm.

The inventors have also recognized and appreciated the importance of performing outer product calculations with minimal latency. Training deep neural networks typically makes us of backpropagation algorithms which involve outer products between the input tensor and the back-propagated error tensors. The result of this outer product is the gradient of the loss/cost function with respect to the weight tensor which is used to update the weight tensor at the next iteration. Reducing the latency of outer product calculations can increase training efficiency of deep neural networks.

FIG. 1 is a schematic diagram of a photonic processing system implementing photonic processing techniques, according to some embodiments of the technology described herein. Photonic processing system 100 includes a controller 102, an optical source 108, and a photonic processor 110.

The photonic processing system 100 may receive, as an input from an external processor (e.g., a CPU, not shown), one or more input matrices represented by a group of input bit strings and may produce an output matrix represented by a group of output bit strings. For example, if an input matrix is an N×N matrix, the input matrix may be represented by $N^2$ separate bit strings, each bit string representing a respective component of the input matrix. The input bit string may be received as an electrical or optical signal from the external processor and the output bit string may be transmitted as an electrical optical signal to the external processor. In some embodiments, the controller 102 does not necessarily output an output bit string after every process iteration. Instead, the controller 100 may use one or more output bit strings to determine a new input bit string to feed through the other components of the photonic processing system 100. In some embodiments, the output bit string itself may be used as the input bit string for a subsequent iteration of the process implemented by the photonic processing system 100. In other embodiments, multiple output bit strings may be combined in various ways to determine a subsequent input bit string. For example, one or more output bit strings may be summed together as part of the determination of the subsequent input bit string.

In some embodiments, the controller 102 includes a processor 104 and a memory 106 for controlling the optical source 108 and/or photonic processor 110. The memory 106 may be used to store input and output bit strings and/or results from the photonic processor 110. The memory 106 may also store executable instructions that, when executed by the processor 104, control the optical source 108 and/or control components of the photonic processor 110 (e.g., encoders, phase shifters, and/or detectors). For example, the memory 106 may store executable instructions that cause the processor 104 to determine new input values to send to the photonic processor 110 based on the number of computational iterations that have occurred. Thus, the output matrix transmitted by the photonic processing system 100 to the external processor may be the result of multiple, accumulated multiplication operations, not simply a single multiplication operation. In another embodiment, the result of the computation by the photonic processing system 100 may be operated on digitally by the processor 104 before being stored in the memory 106. The operations on the bit strings may not be simply linear, but may also be non-linear or, more generally, be Turing complete.

The optical source 108 may be configured to provide the photonic processor 110 with N optical signals, in accordance with some embodiments of the technology. Optical source 108 may include, for example, one or more coherent light sources configured to produce the N optical signals. Optical light source 108, in some embodiments, may include a laser configured to emit light at a wavelength $\lambda_0$. The wavelength of emission may be in the visible, infrared (including near infrared, mid infrared and far infrared) or ultraviolet portion of the electromagnetic spectrum. In some embodiments, $\lambda_0$ may be in the O-band, C-band or L-band.

Each output of optical source 108 may be coupled one-to-one to a single input of the photonic processor 110, in accordance with some embodiments of the technology described herein. In some embodiments, optical source 108 may be disposed on the same substrate (e.g., a same chip) as the photonic processor 110. In such embodiments, the optical signals may be transmitted from the optical source 108 to the photonic processor 110 in waveguides (e.g., silicon photonic waveguides) disposed on the same substrate. In other embodiments, the optical source 108 may be disposed on a separate substrate from the photonic processor 110. In such embodiments, the optical signals may be transmitted from the optical source 108 to the photonic processor 110 through one or more optical fibers.

The photonic processor 110 performs tensor multiplication operations, in accordance with some embodiments of the technology described herein. In some embodiments, the photonic processor 110 includes three parts: encoders configured to encode elements of the input matrices in the amplitude and phase of the optical signals from optical source 108 (see e.g., row and column encoders 202, 204 of FIG. 2), phase shifters configured to correct for phase shifts in the optical signals due to differences in path lengths and/or temperature variations (see e.g., phase shifter 208 of FIG. 2), and detectors configured to combine optical signals, output the combinations as an electrical signal, and accumulate the electrical signals into an electrical signal proportional to a product of the encoded elements (see e.g., detectors 210 of FIG. 2). The photonic processor 110 outputs these electrical signals to the controller 102 for further processing and/or output to the external processor.

In some embodiments, one or more of the input matrices or tensors may be too large to be encoded in the photonic processor using a single pass. In such situations, one portion of the large matrix may be encoded in the photonic processor and the multiplication process may be performed for that single portion of the large matrix and/or matrices. The results of that first operation may be stored in memory 106. Subsequently, a second portion of the large matrix may be encoded in the photonic processor and a second multiplication process may be performed. This "chunking" of the large matrix may continue until the multiplication process has been performed on all portions of the large matrix. The results of the multiple multiplication processes, which may be stored in memory 106, may then be combined to form a final result of the tensor multiplication operation.

Figure 2:
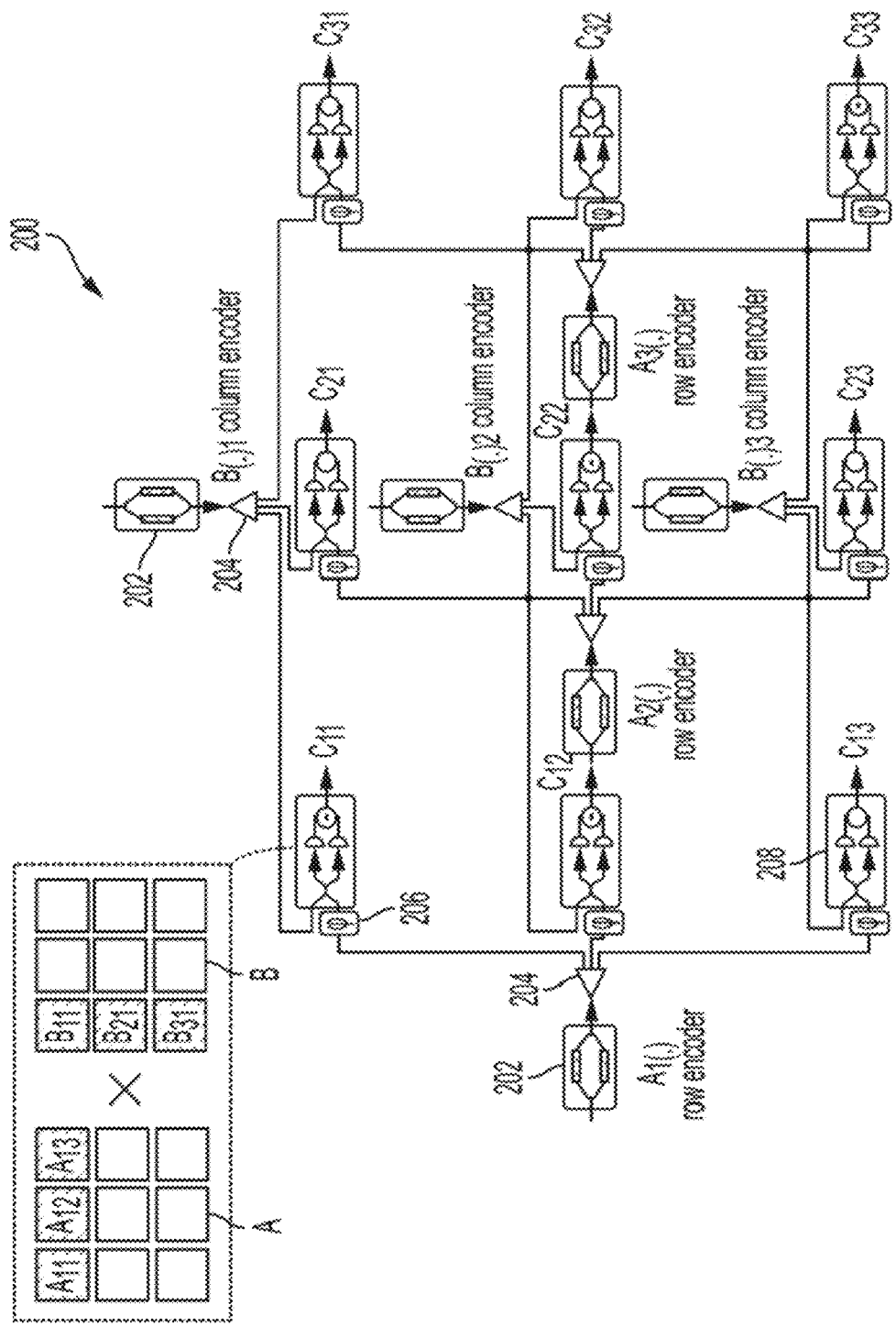
FIG. 2 is a block diagram illustrating an example of a photonic processor, in accordance with some embodiments of the technology described herein.

FIG. 2 is a schematic diagram of an example of a photonic processor 200, in accordance with some embodiments of the technology described herein. Photonic processor 200 may be implemented as photonic processor 110 in the photonic processing system 100 as described in connection with FIG. 1.

Photonic processor 200 shows, for simplicity, a 3×3 instantiation of the technology described herein for optically performing a matrix-matrix multiplication operation, AB=C. It is to be appreciated that photonic processor 200 may be embodied as an N×N or N×M instantiation (where N≠M) to perform matrix-matrix multiplication operations for larger matrices and/or to reduce the amount of "chunking" needed to perform matrix-matrix multiplication operations for larger matrices, as described in connection with FIG. 1.

Photonic processor 200 may include encoders 202, 1-to-N splitters 204, phase shifters 206, and detectors 210, in accordance with some embodiments described herein. Photonic processor 200 may receive optical signals as input from an optical source (e.g., from optical source 108 as described in connection with FIG. 1) and output an electrical signal (e.g., to controller 102 as described in connection with FIG. 1). The optical signals from optical source 108 may first be received by 2N encoders 202 (e.g., N row encoders and N column encoders), which are configured to encode elements from the input matrices into the amplitude and phase of the optical signals.

The elements from the input matrices may be real numbers or complex numbers, in some embodiments. The real numbers may be signed (e.g., may be positive or negative). The real number may represent a certain physical variable or parameter, such as an environmental condition (e.g., temperature, pressure, etc.), information associated with an object (e.g., position, motion, velocity, rate of rotation, acceleration, etc.), information associated with a multimedia file (e.g., acoustic intensity of audio files, pixel color and/or intensity of image or video files), information associated with a certain chemical/organic element or compound (e.g., concentration), information associated with financial assets (e.g., price of a certain security), or any other suitable type of information including information derived from the examples described above. The information represented by the signed, real number may be useful for a variety of reasons, including for example to train a machine learning algorithm, to perform forecasting, data analytics, troubleshooting, or simply to collect data for future use.

Encoders 202 may be implemented as optical modulators, in some embodiments. Examples of optical modulators that may be used as encoders 202 include Mach Zehnder modulators, electro-optical modulators, ring or disk modulators or other types of resonant modulators, electro-absorption modulators, Frank-Keldysh modulators, acousto-optical modulators, Stark-effect modulators, magneto-optical modulators, thermos-optical modulators, liquid crystal modulators, quantum-confinement optical modulators, and/or photonic crystal modulators. In some embodiments, encoders 202 may be implemented as optical modulators such as those described in U.S. patent application Ser. No. 16/412,242, filed May 14, 2019, and titled "Real-Number Photonic Encoding," which is incorporated by reference herein in its entirety.

Encoders 202 may encode the elements of the input matrices in the complex plane, in accordance with some embodiments of the technology described herein. In some embodiments, a value representative of the element of an input matrix may be encoded onto an optical field. In some embodiments, encoding the value onto an optical field involves modulating the phase and the intensity of an optical field based on the value. As a result, the phase and the amplitude of the optical field reflect the encoded value. In an embodiment that uses real number encoding, the phase is chosen between 0, which corresponds to a positive value, and $\pi$, which corresponds to a negative value. In some such embodiments, modulating the phase and amplitude based on the value involves driving a single encoder with a single electrical modulating signal. Thus, a single modulating signal may modulate both the phase and the amplitude of an optical field. In other embodiments, one phase modulator in combination with another amplitude modulator may be needed to correctly encode the values. Some phase modulators, such as those that rely on plasma dispersion, induce a small modulation on the amplitude that is dependent on the amount of phase imparted on the light.

In the example of photonic processor 200 as shown in FIG. 2, there are provided three row encoders, $A_{ik}$, configured to encode row values for the input matrix A in the amplitude and phase of the optical signals, where i labels the matrix row and k labels the clock cycle number. There are also provided three column encoders $B_{kj}$ configured to encode column values for the input matrix B in the amplitude and phase of the optical signals, where j labels the matrix column. At each clock cycle number k, each encoder 202 may encode a new value from its respective input matrix row or column. For example, the row encoder $A_{1k}$ may encode, on the first clock cycle, value $A_{11}$ of input matrix A. At the second clock cycle, encoder $A_{1k}$ may encode value $A_{12}$ of input matrix A. And, at the third clock cycle, encoder $A_{1k}$ may encode value $A_{13}$ of input matrix A. As a further example, the column encoder $B_{k1}$ may encode, on the first clock cycle, value $B_{11}$ of input matrix B. At the second clock cycle, encoder $B_{k1}$ may encode value $B_{21}$ of input matrix B. At the third clock cycle, encoder $B_{k1}$ may encode value $B_{31}$ of input matrix B.

Output encoded optical signals from encoders 202 may be received by optical 1-to-N splitters 204, in accordance with some embodiments of the technology described herein. In some embodiments, the 1-to-N splitters may be manufactured from optical devices with fewer input and output ports (e.g., Y-junctions, directional couplers, multimode interferometers, tunable 1×2 interferometers, tunable 2×2 interferometers) by organizing the devices in a fanout network, e.g., in a binary tree network where the one input (the first level) may be split into two outputs using the aforementioned device, and each output may be further split into two at each level using the aforementioned device until the last level of the tree. In other embodiments, the 1-to-N splitters may be manufactured with a single multimode 1-to-N multimode interferometer, which may be designed using numerical photonics inverse design methods. The 1-to-N splitters 204 may take a single input optical signal and split the input optical signal into N output optical signals. In some embodiments, there may be 2N 1-to-N splitters 204, each 1-to-N splitter 204 being coupled to a single encoder 202. In the example of photonic processor 200, each of the 1-to-N splitters 204 have three output channels (e.g., N=3) corresponding to the three entries in the rows and columns of matrices A and B. It may be appreciated that a number of output channels of the 1-to-N splitters 204 may be determined based on a desired size of the input matrices. The outputs of the 1-to-N splitters 204 may be coupled to phase shifters 206 and/or detectors 208 through waveguides (e.g., silicon photonic waveguides) or through fiber optics.

In some embodiments, output optical signals from the 1-to-N splitters 204 may be coupled to one or more inputs of detectors 208. Detectors 208 may be photodetectors configured to receive two or more input optical signals and output an electrical signal (e.g., a photocurrent) proportional to an intensity of the input optical signals. Detectors 208 may be, for example, homodyne detectors, heterodyne detectors, intradyne detectors, Dolinar detectors, and/or any suitable coherent detector. In some embodiments, detectors 208 may receive a first encoded optical signal corresponding to an encoded row value from a first encoder 202 and a second encoded optical signal corresponding to an encoded column value from a second encoder 202. In such embodiments, the output electrical signal at each detector 208 may be proportional to a product of the encoded row value and the encoded column value.

In the example of FIG. 2, detectors 208 are depicted as homodyne detectors. It should be appreciated that detectors 208 could alternatively be shown as heterodyne detectors, intradyne detectors, Dolinar detectors, and/or any other suitable coherent detector. In this example, at each clock cycle number k, each one of the detectors 208 responsible for producing an output element $C_{ij}$ may receive an optical signal corresponding to element $A_{ik}$ (e.g., an optical field $A_{ik}$) at a top arm of the detector 208 and an optical signal corresponding to element $B_{kj}$ (e.g., an optical field $B_{kj}$) at a bottom arm of the detector 208. For example, at a first clock cycle, the detector 208 responsible for producing output element $C_{11}$ may receive an optical signal corresponding to element $A_{11}$ at a top arm of the detector 208 and an optical signal corresponding to element $B_{11}$ at the bottom arm of the detector 208. At a second clock cycle, the detectors 208 responsible for producing output element $C_{11}$ may receive an optical signal corresponding to element $A_{12}$ at the top arm of the detector 208 and an optical signal corresponding to element $B_{21}$ at the bottom arm of the detector 208. At a third clock cycle, the detectors 208 responsible for producing output element $C_{11}$ may receive an optical signal corresponding to element $A_{13}$ at the top arm of the detector 208 and an optical signal corresponding to element $B_{31}$ at the bottom arm of the detector 208. Effectively, at every clock cycle k, the photonic processor produces electrical signals in the array of detectors that are proportional to the outer-product between the column of the encoded row values (e.g., a row of matrix A) and the row of the encoded column values (e.g., a column of matrix B). Therefore, in some embodiments, the photonic processor may be purposed for computing the outer product between an input column vector and an input row vector that produces an output matrix.

In some embodiments, the detector 208 may include a 50-50 directional coupler, as will be described in further detail in connection with FIGS. 4 and 5, which is configured to transform the optical field at the top arm into $(A_{ik}+iB_{kj})/\sqrt{2}$ and $(iA_{ik}+B_{kj})/\sqrt{2}$ the bottom arm. Each output of the top arm and the bottom arm of the 50-50 directional coupler of detector 208 may be fed into a photodetector configured to generate an electrical signal (e.g., a photocurrent) that may be proportional to the intensity of the light received. The electrical signal generated from the top arm may be described by:

$$i_T \propto \left|\frac{A_{ik}+iB_{kj}}{\sqrt{2}}\right|^2 = \frac{1}{2}\left(|A_{ik}|^2 + |B_{kj}|^2 + iA_{ik}^*B_{kj} - iA_{ik}B_{kj}^*\right)$$

and the electrical signal generated from the bottom arm may be described by:

$$i_B \propto \left|\frac{iA_{ik}+B_{kj}}{\sqrt{2}}\right|^2 = \frac{1}{2}\left(|A_{ik}|^2 + |B_{kj}|^2 - iA_{ik}^*B_{kj} + iA_{ik}B_{kj}^*\right).$$

In the example of FIG. 2, the electronic circuitry of detectors 208 may connect an anode of one photodetector with a cathode of another photodetector within each of the detectors 208, as described in more detail in connection with FIGS. 4 and 5 herein. In such embodiments, an output current from this circuitry may be proportional to the difference between the two photocurrents, $i_T$ and $i_B$. The output current may be described by:

$$i_{Out} \propto 2|A_{ik}||B_{kj}|\cos(\theta-\phi) \propto A_{ik}B_{kj},$$

which gives the correct sign and magnitude for multiplying two real numbers, $A_{ik}$ and $B_{kj}$. It may be appreciated that in the example of FIG. 2, a total of nine such multiplication operations are performed simultaneously—one in each detector 208.

In some embodiments, at each clock cycle, a new multiplication operation may be performed in each detector 208, and the results from the previous multiplication operation may be output by detectors 208 to an accumulator (not shown). In some embodiments, the output photocurrent of each detector 208 may be converted to a voltage using a transimpedance circuit (not shown) prior to the output being sent to the accumulator. The accumulation may be performed by applying a low-pass filter at an output of the transimpedance circuit with a bandwidth proportional to clock-frequency/N (e.g., for the example of FIG. 2, clock-frequency/3). In such embodiments, an electrical storage device (e.g., a capacitor and/or a digital register) may accumulate the energy associated with the sum of three photocurrents, and a single number may be read out at every detector 208 after every N clock cycles (e.g., after every three clock cycles for the example of FIG. 2). The number read out may be proportional to the desired output matrix value $C_{ij}$. As an example, for the detector 208 responsible for producing the output $C_{11}$ of FIG. 2, an associated accumulator (not shown) may accumulate the sum value corresponding to the dot product of the matrix row $A_{1k}$ and matrix column $B_{k1}$ (e.g., such that $C_{11}=A_{11}B_{11}+A_{12}B_{21}+A_{13}B_{31}$).

In some embodiments, the detectors 208 may be replaced with two photonic receivers, one for each arm of the detectors 208, and the multiplication may be performed digitally. The configuration between the encoders and receivers may enable broadcasting photonic signals from the encoders to the receivers to perform an outer product in a parallel manner. The advantage of these embodiments is that the multiplication may be done at full precision using digital circuitry while maintaining efficient broadcasting operations using photonics. In such embodiments, the optical signals may not necessarily encode the values in the analog domain, but the values may be encoded in the digital domain. As such, the digital values broadcasted may be in the integer number type format or they may be in the floating-point number type format, and/or in any other suitable digital number representations. The digital circuitry that performs the multiplication may perform the operations according to the number representation of the broadcasted digital values. Furthermore, depending on the encoding scheme of the encoders (e.g., signal modulation, amplitude modulation, BPSK, QAM, or any other suitable encoding scheme) the appropriate detectors (e.g., direct detectors, homodyne detectors, heterodyne detectors, and/or any other suitable coherent detectors) may be utilized. In some embodiments, when the multiplication may not be performed with a sufficiently low latency compared to the clock cycles of the transmission, pipelining strategies may be implemented such that while the values are broadcasted, the multiplication operations occur simultaneously.

In some embodiments, the output optical signals from the 1-to-N splitters 204 may be received by phase shifters 206 prior to being received by detectors 208. Because the values of the input matrices are encoded in both amplitude and phase of the optical signals, phase shifters 206 may be configured to correct for any possible phase errors that may occur between encoders 202 and detectors 208. For example, phase shifters 206 may correct for static phase errors. For example, phase shifters 206 may correct for phase errors caused by differences in path lengths between different ones of the 1-to-N splitters 204 and detectors 208. Alternatively or additionally, phase shifters 206 may correct for dynamic phase errors. For example, phase shifters 206 may correct for phase errors caused by thermal fluctuations. It may be appreciated that, while the example of FIG. 2 shows phase shifters 206 coupled to one input of detectors 208, in some embodiments phase shifters 206 may be coupled to all inputs of detectors 208.

Figure 3A:
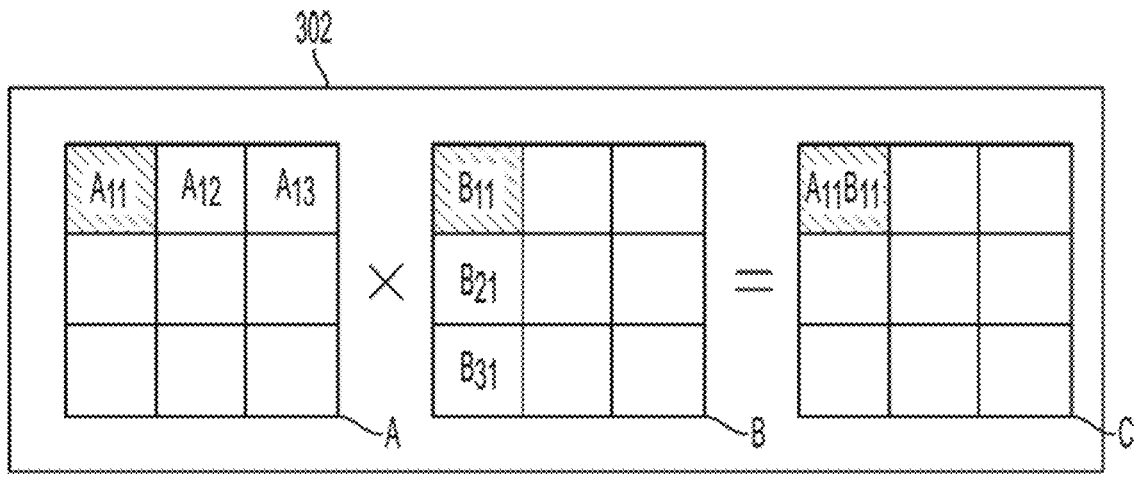
FIGS. 3A-3C are schematic diagrams illustrating a method of performing matrix multiplication in accordance with the method of FIG. 6, in accordance with some of the embodiments of the technology described herein.
Figure 3B:
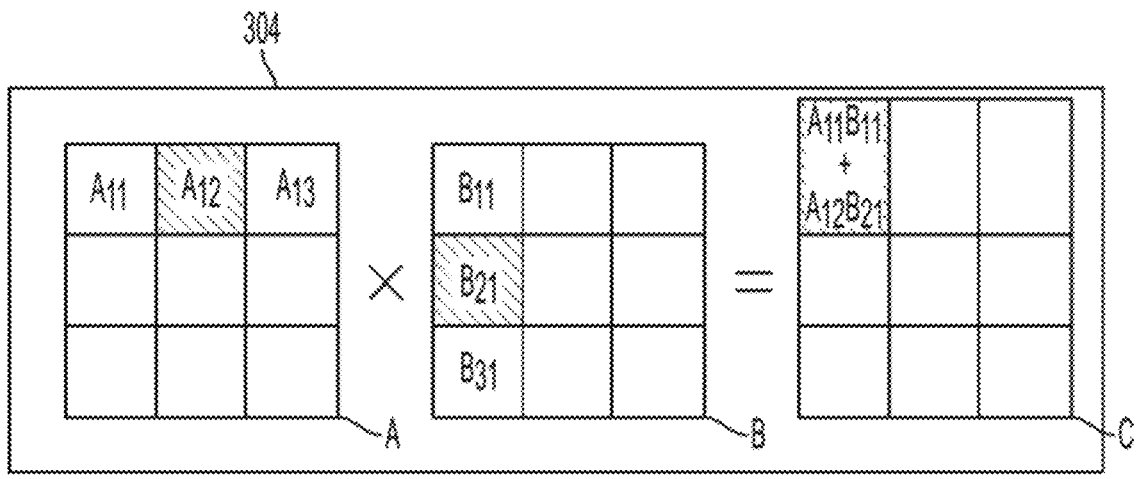
Figure 3C:
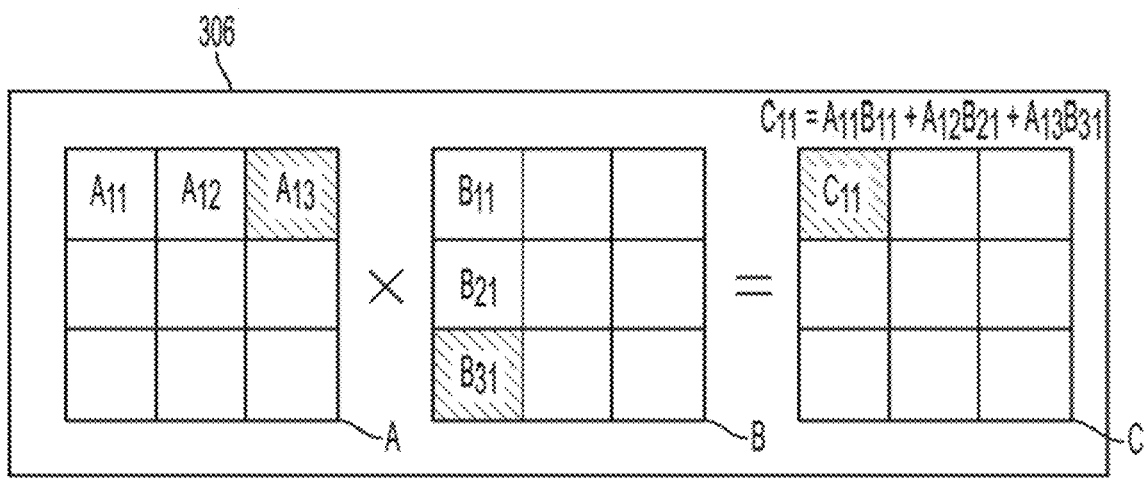

FIGS. 3A-3C show a schematic diagram of a method of performing tensor multiplication using a photonic processor (e.g., photonic processor 200 as described in connection with FIG. 2), in accordance with some embodiments described herein. The method of FIGS. 3A-3C may be implemented by a single detector (e.g., a single detector 208) of a photonic processor and may output a single element of an output matrix. It may be appreciated that other detectors of the photonic processor may be simultaneously performing different multiplication operations to produce different elements of the output matrix.

In act 302 of FIG. 3A, element $A_{11}$ of input matrix A and element $B_{11}$ of input matrix B may be loaded into the photonic processor. The photonic processor may encode element $A_{11}$ into an amplitude and a phase of an optical signal (e.g., using an encoder such as encoder 202) and may encode element $B_{11}$ into an amplitude and a phase of a different optical signal (e.g., using an encoder such as encoder 202). The encoded optical signals may be sent to a detector (e.g., detector 208) which may output an electrical signal (e.g., a photocurrent) proportional to a product of elements $A_{11}$ and $B_{11}$. The electrical signal may be accumulated by an accumulator represented by the matrix C in the examples of FIGS. 3A-3C.

In act 304 of FIG. 3B, element $A_{12}$ of input matrix A and element $B_{21}$ of input matrix B may be loaded into the photonic processor. The photonic processor may encode element $A_{12}$ into an amplitude and a phase of an optical signal (e.g., using an encoder such as encoder 202) and may encode element $B_{21}$ into an amplitude and a phase of a different optical signal (e.g., using an encoder such as encoder 202). The encoded optical signals may be sent to a detector (e.g., detector 208) which may output an electrical signal (e.g., a photocurrent) proportional to a product of elements $A_{12}$ and $B_{21}$. The accumulator may then "add" the electrical signal proportional to a product of elements $A_{12}$ and $B_{21}$ to the previous electrical signal accumulated during act 302.

In act 306 of FIG. 3C, element $A_{13}$ of input matrix A and element $B_{31}$ of input matrix B may be loaded into the photonic processor. The photonic processor may encode element $A_{13}$ into an amplitude and a phase of an optical signal (e.g., using an encoder such as encoder 202) and may encode element $B_{31}$ into an amplitude and a phase of a different optical signal (e.g., using an encoder such as encoder 202). The encoded optical signals may be sent to a detector (e.g., detector 208) which may output an electrical signal (e.g., a photocurrent) proportional to a product of elements $A_{13}$ and $B_{31}$. The accumulator may then "add" the electrical signal proportional to a product of elements $A_{13}$ and $B_{31}$ to the previous electrical signals accumulated during acts 302 and 304 to form a total accumulated signal proportional to the output matrix element $C_{11}$. The accumulated signal may then be read out from the photonic processor for use by, for example, controller 102, processor 104, memory 106 as described in connection with FIG. 1 and/or another external processor and/or memory.

The inventors have recognized and appreciated that performing such tensor multiplication operations as described in connection with FIGS. 2 and 3 may call for significant readout circuitry to read out the result at its full precision. For example, if the $A_{ik}$ row encoder system (including, e.g., a digital-to-analog converter (DAC) and encoder 202) has a bit precision of $b_{row}$ and the $B_{kj}$ column encoder system (including e.g., a DAC and encoder 202) has a bit precision of $b_{col}$, then the detector system (including e.g., analog-to-digital converter (ADC) readout circuitry) may need to be precise up to a $b_{row}+b_{col}+\log_2 N$ bits to achieve full precision. The values read by the ADC may be rounded and/or truncated otherwise. However, readout circuitry with a precision of $b_{row}+b_{col}+\log_2 N$ bits may be difficult to manufacture if $b_{row}+b_{col}+\log_2 N$ is large.

Accordingly, the inventors have developed a method for reducing the needed complexity of the readout circuitry. Rather than reading out the full product values after every N clock cycles, in some embodiments, the partial product values after every clock cycle may be readout at a full precision of $b_{row}+b_{col}$. The accumulation operations may be performed by an external processor (e.g., processor 104 as described in connection with FIG. 1). While this method may reduce the readout bit precision required, it may also increase the readout circuitry bandwidth by a factor of N.

Alternatively or additionally, in some embodiments, the number of bits of $b_{row}$ and $b_{col}$ may be reduced. A final value of the output matrix element $C_{ij}$ may then be obtained at full precision by performing partial sums. For example, both $b_{row}$ and $b_{col}$ may be n-bit numbers such that $b_{row} \in \{0,1\}^n$ and $b_{col} \in \{0,1\}^n$. A result, c, of their product, $b_{row} \times b_{col} = c$, may be a 2n-bit number. It may be shown that by dividing both $b_{row}$ and $b_{col}$ into d division each and performing partial sums may be an efficient method by which the result c may be truncated to an n-bit number. Each division of $b_{row}$ and $b_{col}$ may contain k=n/d bits, such that:

$$b_{row}=b_{r0}b_{r1}\ldots b_{r(d-1)}=b_{r0}2^{k(d-1)}+b_{r1}2^{k(d-2)}+\ldots+b_{r(d-1)}2^0, \text{ and}$$

$$b_{col}=b_{c0}b_{c1}\ldots b_{c(d-1)}=b_{c0}2^{k(d-1)}+b_{c1}2^{k(d-2)}+\ldots+b_{c(d-1)}2^0.$$

The multiplication may be further truncated to perform the multiplication only to a certain order, p, in some embodiments:

$$b_{row} \times b_{col}=c=c_0 2^{k(d-1)}+c_1 2^{k(d-2)}+\ldots+c_{(d-1)}$$
$$2^0 = \Sigma_{p=0}^{2(d-1)} c_p 2^{2k(d-1)-pk}.$$

If all multiplications are performed up to $p=2(d-1)$, then there may be a total of $d^2$ partial sums performed between two k-bit numbers. If $p \leq d-1$, then there may be a total of $\frac{1}{2}d(d+1)$ partial sums performed between two k-bit numbers.

The inventors have further recognized and appreciated that this method of reducing the number of bits in a value may be extended to matrix multiplication operations and/or other linear tensor operations. For a matrix-vector multiplication represented in Einstein notation as $y^i=\Sigma_j M^{ij}x^j$, where each element of $M^{ij} \in \{0,1\}^n$ and $x^j \in \{0,1\}^n$ is an n-bit number, the same partial-product technique may be applied to obtain a fully precise result $y^j$, whose elements are 2n-bit numbers.

In some embodiments, each matrix and vector may be divided into d divisions. Each division may contain k=n/d bits such that:

$$M^{ij}=M_0^{ij}M_1^{ij}\ldots M_{d-1}^{ij}=M_0^{ij}2^{k(d-1)}+M_1^{ij}2^{k(d-2)}+\ldots+M_{d-1}^{ij}2^0, \text{ and}$$

$$x^j=x_0^j x_1^j \ldots x_{d-1}^j=x_0^j 2^{k(d-1)}+x_1^j 2^{k(d-2)}+\ldots+x_{d-1}^j 2^0.$$

Performing the matrix-vector multiplication may yield:

$$y^i=\Sigma_j M^{ij}x^j$$

$$y^i=\Sigma_j(M_0^{ij}2^{k(d-1)}+M_1^{ij}2^{k(d-2)}+\ldots+M_{d-1}^{ij}2^0)(x_0^j 2^{k(d-1)}+x_1^j 2^{k(d-2)}+\ldots+x_{d-1}^j 2^0)$$

$$y^i=\Sigma_j(\Sigma_{p=0}^{2(d-1)} \Sigma_{a,b}^{a+b=p} M_a^{ij}x_b^j 2^{2k(d-1)-pk})$$

$$y^i=\Sigma_{p=0}^{2(d-1)}\{(\Sigma_{a,b}^{a+b=p} \Sigma_j M_a^{ij}x_b^j)2^{2k(d-1)-pk}\}$$

$$y^i=\Sigma_{p=0}^{2(d-1)} y_p^i 2^{2k(d-1)-pk}$$

where $y_p^i=\Sigma_{a,b}^{a+b=p}\Sigma_j M_a^{ij}x_b^j$. The number of matrix-vector products that may be performed may be $d^2$. Alternatively or additionally, it may be appreciated that the function $y_p^i=\Sigma_{a,b}^{a \alpha b=p}\Sigma_j M_a^{ij}x_b^j$ may be replaced with any tensor operation.

Figure 4:
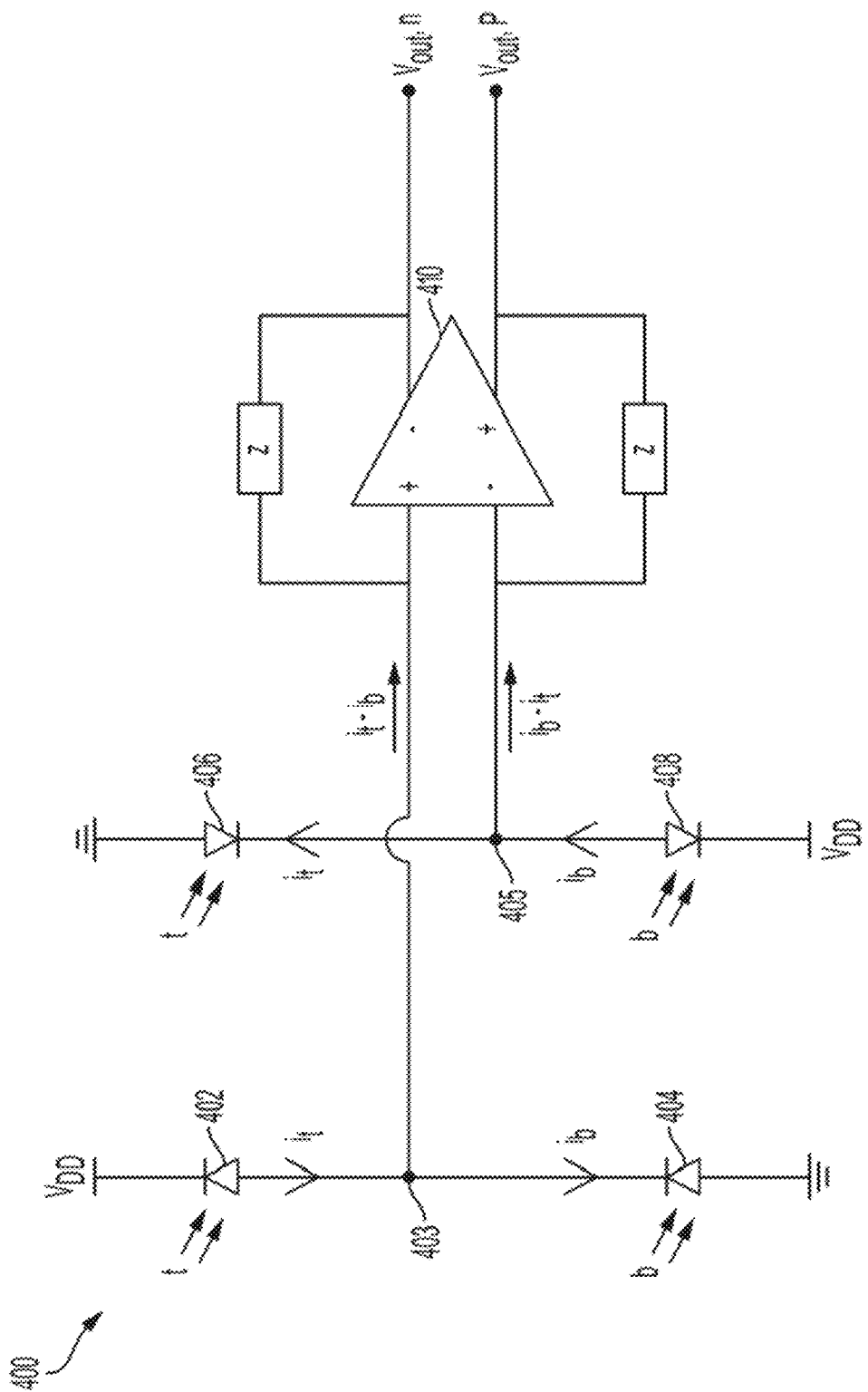
FIG. 4 is a circuit diagram illustrating an example of a differential optical receiver, in accordance with some embodiments of the technology described herein.

FIG. 4 illustrates a non-limiting example of an optical receiver 400 (e.g., a portion of detector 208 of FIG. 2), in accordance with some non-limiting embodiments of the present application and as described in U.S. patent application Ser. No. 16/411,391 titled "Optical Differential Low-Noise Receivers and Related Methods" filed May 14, 2019, which is incorporated by reference herein in its entirety. As shown, optical receiver 400 may include photodetectors 402, 404, 406 and 408, though other implementations include more than four photodetectors. Photodetector 402 may be connected to photodetector 404, and photodetector 406 may be connected to photodetector 408. In some embodiments, the anode of photodetector 402 may be connected to the cathode of photodetector 404 (e.g., at node 403), and the cathode of photodetector 406 may be connected to the anode of photodetector 408 (e.g., at node 405). In the example of FIG. 4, the cathodes of photodetectors 402 and 408 are connected to voltage supply $V_{DD}$ and the anodes of photodetectors 404 and 406 are connected to a reference potential (e.g., to ground). The opposite arrangement is also possible in some embodiments. The reference potential may be at a potential equal to zero or having any suitable value, such as $-V_{DD}$. $V_{DD}$ may have any suitable value.

Photodetectors 402-408 may be implemented in any of numerous ways, including for example with pn-junction photodiodes, pin-junction photodiodes, avalanche photodiodes, phototransistors, and/or photoresistors. The photodetectors may include a material capable of absorbing light at the wavelength of interest. For example, at wavelengths in the O-band, C-band or L-band, the photodetectors may have an absorption region made at least in part of germanium and/or indium gallium arsenide (InGaAs), by way of a non-limiting example. For visible light, the photodetectors may have an absorption region made at least in part of silicon, by way of another non-limiting example.

Photodetectors 402-408 may be integrated components formed monolithically as part of the same substrate. The substrate may be a silicon substrate in some embodiments, such as a bulk silicon substrate or a silicon-on-insulator. Other types of substrates can also be used, including for example indium phosphide or any suitable semiconductor material. To reduce variability in the characteristics of the photodetectors due to fabrication tolerances, in some embodiments, the photodetectors may be positioned in close proximity to one another. For example, the photodetectors may be positioned on a substrate within an area of 1 mm² or less, 0.1 mm² less or 0.01 mm² or less.

As further illustrated in FIG. 4, photodetectors 402-408 may be connected to a differential operational amplifier (DOA) 410. For example, photodetectors 402 and 404 may be connected to a non-inverting input ("+") of DOA 410 and photodetectors 406 and 408 may be connected to an inverting input ("−") of DOA 410. DOA 410 may have a pair of outputs. One output may be inverting and one output may be non-inverting.

In some embodiments, as will be described in detail in connection with FIG. 5, photodetectors 402 and 406 may be arranged to receive the same optical signal, t, and photodetectors 404 and 408 may be arranged to receive the same optical signal, b. In some embodiments, photodetectors 402-408 may be designed to be substantially similar to each other. For example, photodetectors 402-408 may be formed using the same process steps and using the same photomask patterns. In these embodiments, photodetectors 402-408 may exhibit substantially the same characteristics, such as substantially the same responsivity (the ratio between the photocurrent and the received optical power) and/or substantially the same dark current (the current generated when no optical power is received). In these embodiments, the photocurrents generated by photodetectors 402 and 406 responsive to reception of signal t may be substantially equal to each other. Such photocurrents are identified as $i_t$ in FIG. 4. It should be noted that, due to the orientations of photodetectors 402 and 406, the photocurrents generated by photodetectors 402 and 406 may be oriented in opposite directions. That is, the photocurrent of photodetector 402 may be directed towards node 403 and the photocurrent of photodetector 406 may be oriented away from node 405. Furthermore, the photocurrents generated by photodetectors 404 and 408 responsive to reception of signal b may be substantially equal to each other. Such photocurrents are identified as $i_b$. Due to the orientations of photodetectors 404 and 408 relative to each other, the photocurrents generated by photodetectors 404 and 408 may be oriented in opposite directions. That is, the photocurrent of photodetector 408 may be directed towards node 405 and the photocurrent of photodetector 404 may be oriented away from node 403.

In view of the orientations of the photodetectors, a current with amplitude $i_t - i_b$ emerges from node 403 and a current with amplitude $i_b - i_t$ emerges from node 405. Thus, the currents may have substantially the same amplitudes, but may have opposite signs.

Figure 5:
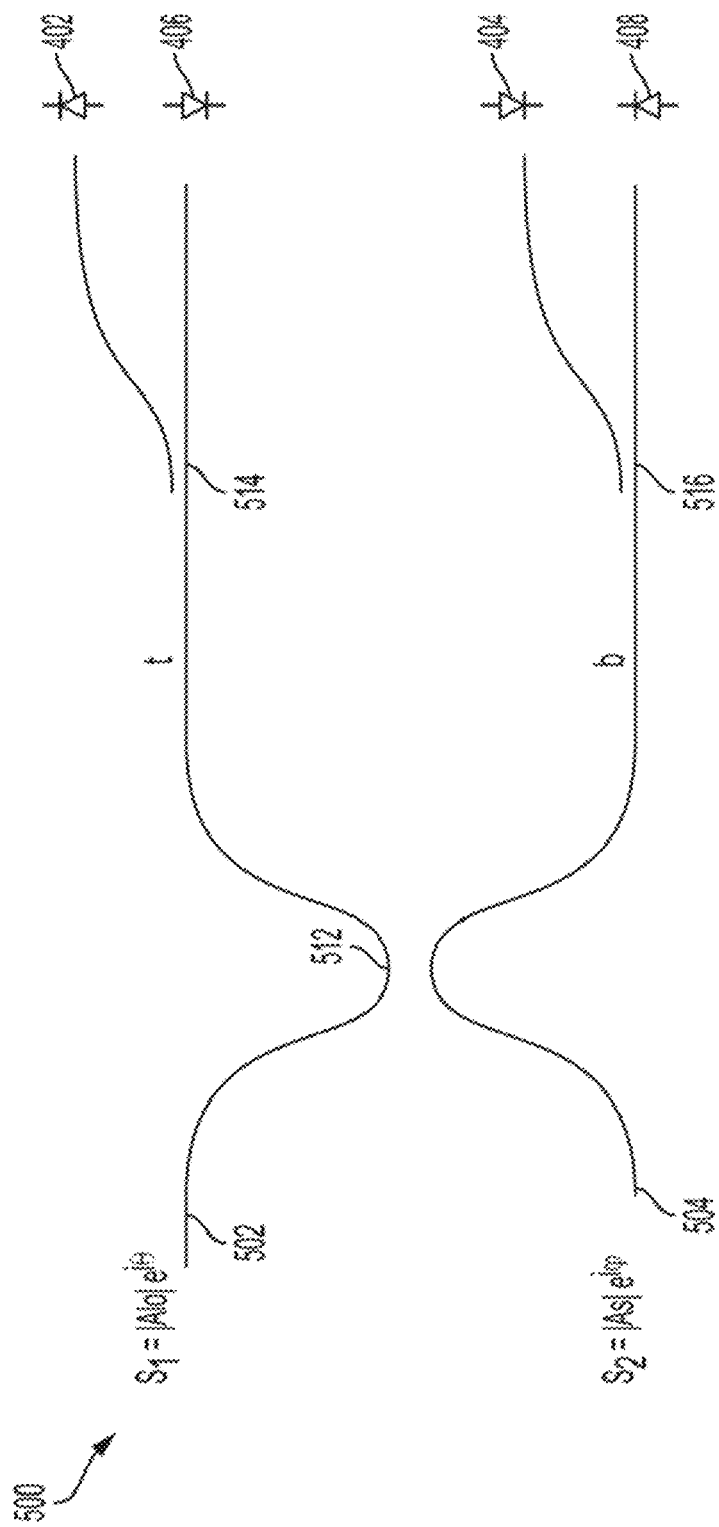
FIG. 5 is a schematic diagram illustrating a photonic circuit that may be coupled with the differential optical receiver of FIG. 3, in accordance with some embodiments of the technology described herein.

FIG. 5 illustrates a photonic circuit 500 (e.g., a portion of detector 208 of FIG. 2) arranged for providing two optical signals to photodetectors 402-408, in accordance with some non-limiting embodiments. Photonic circuit 500 may comprise optical waveguides for routing the optical signals to the photodetectors. The optical waveguides may be made of a material that is transparent or at least partially transparent to light at the wavelength of interest. For example, the optical waveguides may be made of silicon, silicon oxide, silicon nitride, indium phosphide, gallium arsenide, or any other suitable material. In the example of FIG. 5, photonic circuit 500 includes input optical waveguides 502 and 504 and couplers 512, 514 and 516. As further illustrated, the output optical waveguides of photonic circuit 500 may be coupled to photodetectors 402-408.

In the example of FIG. 5, couplers 512, 514 and 516 comprise directional couplers, where evanescent coupling enables transfer of optical power between adjacent waveguides. However, other types of couplers may be used such as Y-junctions, X-junctions, optical crossovers, counter-direction couplers, etc. In other embodiments, photonic circuit 500 may be implemented with a multi-mode interferometer (MMI). Couplers 512, 514 and 516 may be 3 dB couplers (with a 50%-50% coupling ratio) in some embodiments, though other ratios are also possible, such as 51%-49%, 55%-45% or 60%-40%. It should be appreciated that, due to fabrication tolerances, the actual coupling ratio may deviate slightly from the intended coupling ratio.

Signal $s_1$ may be provided at input optical waveguide 502 and signal $s_2$ may be provided at input optical waveguide 504. Signals $s_1$ and $s_2$ may be provided to the respective input optical waveguides using for example optical fibers. In some embodiments, $s_1$ represents a reference local oscillator signal, such as the signal generated by a reference laser, and $s_2$ represents the signal to be detected. As such, the optical receiver may be viewed as a homodyne optical receiver. In some such embodiments, $s_1$ may be a continuous wave (CW) optical signal while $s_2$ may be modulated. In other embodiments, both signals are modulated or both signals are CW optical signals, as the application is not limited to any particular type of signal.

In the example of FIG. 5, signal $s_1$ has amplitude $A_{LO}$ and phase $\theta$, and signal $s_2$ has amplitude $A_s$ and phase $\phi$. Coupler 512 combines signals $s_1$ and $s_2$ such that signals t and b emerge at respective outputs of coupler 212. In the embodiments in which coupler 512 is a 3 dB coupler, t and b may be described by the following expression:

$$\begin{pmatrix} t \\ b \end{pmatrix} = \frac{1}{\sqrt{2}} \begin{pmatrix} 1 & i \\ i & 1 \end{pmatrix} \begin{pmatrix} A_{LO}e^{i\theta} \\ A_s e^{i\phi} \end{pmatrix}$$

and the powers T and B (of t and b, respectively) may be given by the following expressions:

$T = [A_{LO}^2 + A_s^2 + 2A_{LO}A_s \sin(\theta - \phi)]$ $B = [A_{LO}^2 + A_s^2 - 2A_{LO}A_s \sin(\theta - \phi)]$ Thus, in the embodiments in which couplers 514 and 516 are 3 dB couplers, photodetectors 402 and 406 may each receive a power given by T/2 and photodetectors 404 and 408 may each receive a power given by B/2.

Referring back to FIG. 4, and assuming that the responsivities of photodetectors 402-408 are all equal to each other (though not all embodiments are limited in this respect), the currents emerging from node 403 and 405, respectively, may be given by the following expressions:

$$i_t - i_b = 2A_{LO}A_S \sin(\theta - \phi)$$

$$i_b - i_t = -2A_{LO}A_S \sin(\theta - \phi)$$

DOA 410 may be arranged to amplify the differential signal received at the "+" and "−" inputs, and to produce an amplified differential output, represented in FIG. 4 by voltages $V_{out,n}$ and $V_{out,p}$. In some embodiments, DOA 410, in combination with impedances z, may be viewed as a differential transimpedance amplifier, in that it produces a differential pair of voltage ($V_{out,n}$, $V_{out,p}$) based on a differential pair of current ($i_b - i_t$, $i_t - i_b$). In some embodiments, each of $V_{out,n}$, $V_{out,p}$ may be proportional to the difference between current $i_t - i_b$ and current $i_b - i_t$, thus giving rise to the following expressions:

$$V_{out,p} = 2z(i_t - i_b)$$

$$V_{out,n} = 2z(i_b - i_t)$$

This differential pair of voltages may be provided as input to any suitable electronic circuit, including but not limited to an analog-to-digital converter (not shown in FIG. 4).

Figure 6:
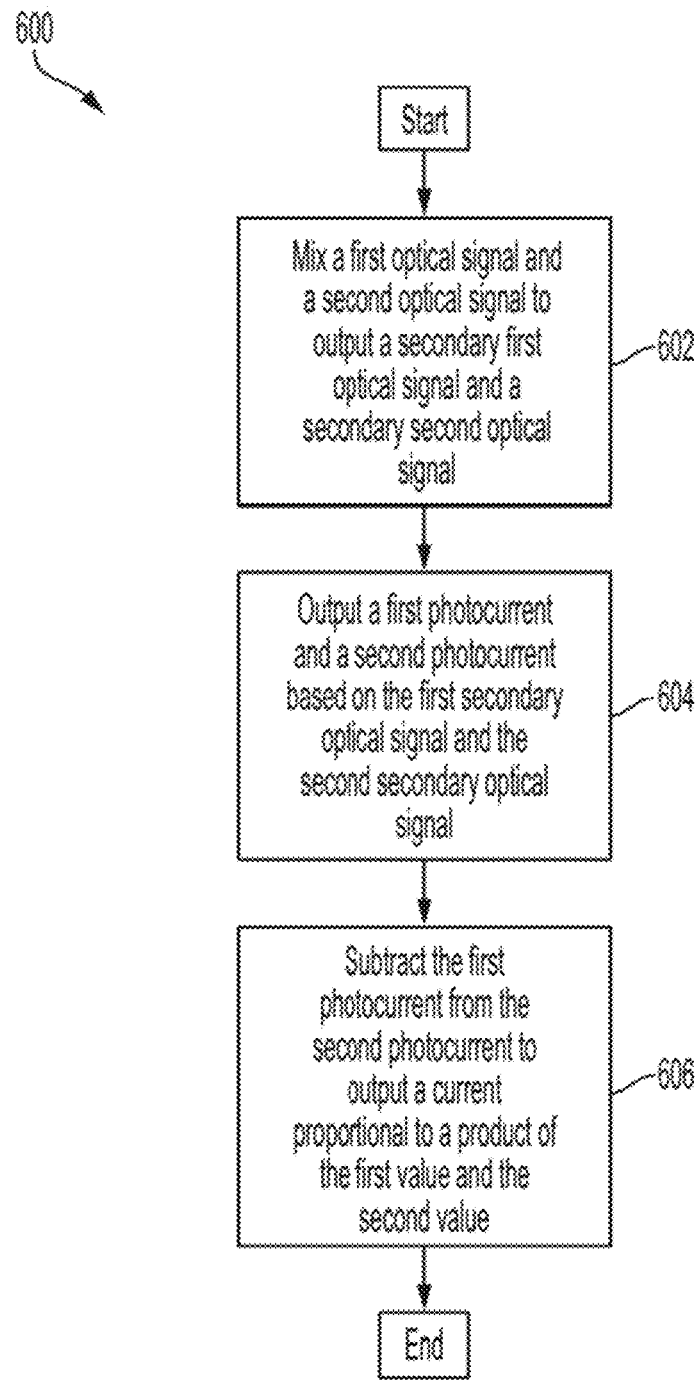
FIG. 6 is a flowchart illustrating a method of performing multiplication using the photonic circuit of FIGS. 4 and 5, in accordance with some embodiments of the technology described herein.

FIG. 6 illustrates a method 600 of performing a multiplication operation using a homodyne detector (e.g., a detector comprising optical receiver 400 of FIG. 4 and photonic circuit 500 of FIG. 5), in accordance with some embodiments of the technology described herein.

In act 602, a first optical signal, $r_1$, and a second optical signal, $r_2$, may be mixed. The first optical signal and second optical signal may be encoded optical signals. For example, a first numerical value and a second numerical value may be encoded into an amplitude and a phase of the first optical signal and the second optical signal, respectively. Encoding of the first numerical value and the second numerical value may be performed by, for example, an encoder such as encoder 202 as described in connection with FIG. 2, or any other suitable optical encoding device.

Mixing of the first optical signal and the second optical signal may comprise using an optical coupler, such as coupler 512 as described in connection with FIG. 5, in accordance with some embodiments of the technology described herein. In such embodiments, the first optical signal and the second optical signal may be transformed into a first mixed optical signal and a second mixed optical signal. The first mixed optical signal and the second mixed optical signal may have magnitudes of $(r_1 + ir_2)/\sqrt{2}$ and $(ir_1 + r_2)/\sqrt{2}$, respectively, as described in connection with FIG. 2.

In act 604, a first photocurrent and a second photocurrent may be output, in accordance with some embodiments of the technology described herein. The first photocurrent and the second photocurrent may be generated based on the first mixed optical signal and the second mixed optical signal. For example, the first mixed optical signal and the second mixed optical signal may be detected by photodetectors (e.g., photodetectors 402-408 as described in connection with FIG. 4) configured to output a photocurrent based on an intensity of a detected optical signal.

In act 610, the first photocurrent may be subtracted from the second photocurrent, in accordance with some embodiments described herein. In some embodiments, the first photocurrent may be subtracted from the second photocurrent using, for example, a differential operational amplifier (e.g., differential operational amplifier 410 as described in connection with FIG. 4). The difference between the first photocurrent and the second photocurrent may be output as an output photocurrent. The output photocurrent may be proportional to a product of the first numerical value and the second numerical value.

Figure 7:
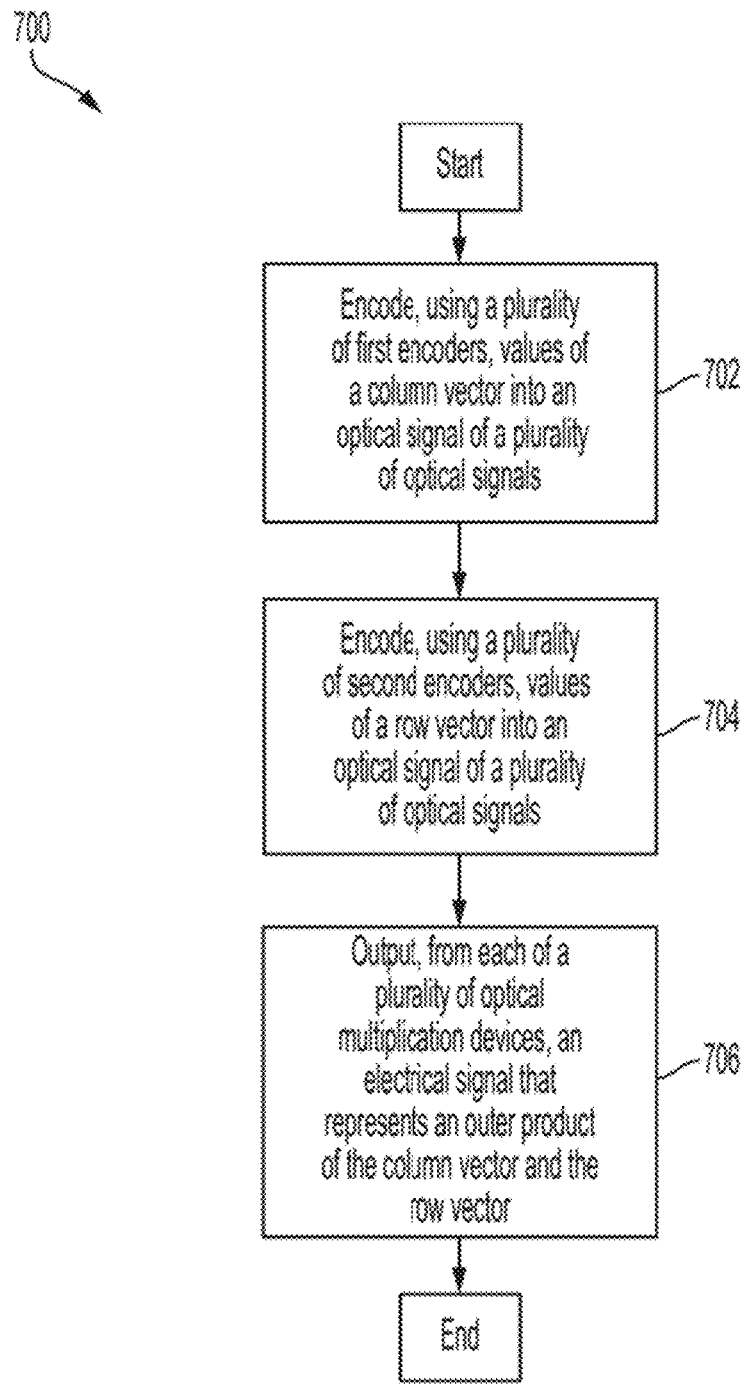
FIG. 7 is a flowchart illustrating a method of performing an outer-product using the photonic processor of FIG. 2, in accordance with some embodiments of the technology described herein.

FIG. 7 illustrates a method 700 of performing an outer product operation using a photonic processor (e.g., the photonic processor of FIG. 2), in accordance with some embodiments of the technology described herein.

In act 702, values of a column vector may be encoded into a plurality of optical signals using a plurality of first encoders, in accordance with some embodiments described herein. Each value of the values of the column vector may be encoded into a single optical signal of the plurality of optical signals. The value may be encoded into an amplitude and a phase of the single optical signal, as described herein. Each of the first encoders may be, for example, an encoder such as encoder 202 as described in connection with FIG. 2, or any other suitable optical encoding device.

In act 704, values of a row vector may be encoded into another plurality of optical signals using a plurality of second encoders, in accordance with some embodiments described herein. Each value of the values of the row vector may be encoded into a single optical signal of the another plurality of optical signals. The value may be encoded into an amplitude and a phase of the single optical signal, as described herein. Each of the second encoders may be, for example, an encoder such as encoder 202 as described in connection with FIG. 2, or any other suitable optical encoding device.

The plurality of first encoders and the plurality of second encoders may be coupled to a plurality of optical multiplication devices. The optical multiplication devices may be, for example, detectors 208 as described in connection with FIG. 2, or any other suitable optical multiplication device. The coupling may be arranged as described in connection with FIG. 2, or any other suitable coupling arrangement configured to perform an outer product may be implemented. After the values of the column vector and the values of the row vector are encoded into the pluralities of optical signals, the pluralities of optical signals may be sent to the optical multiplication devices through any suitable optical coupling means (e.g., through a waveguide and/or fiber optical system as described herein).

Each of the plurality of optical multiplication devices may output an electrical signal that represents a product of a value of the column vector and a value of the row vector, in accordance with some embodiments described herein. In act 706, the plurality of optical multiplication devices may output a plurality of electrical signals, the plurality of electrical signals representing an outer product of the column vector and the row vector.

Figure 8:
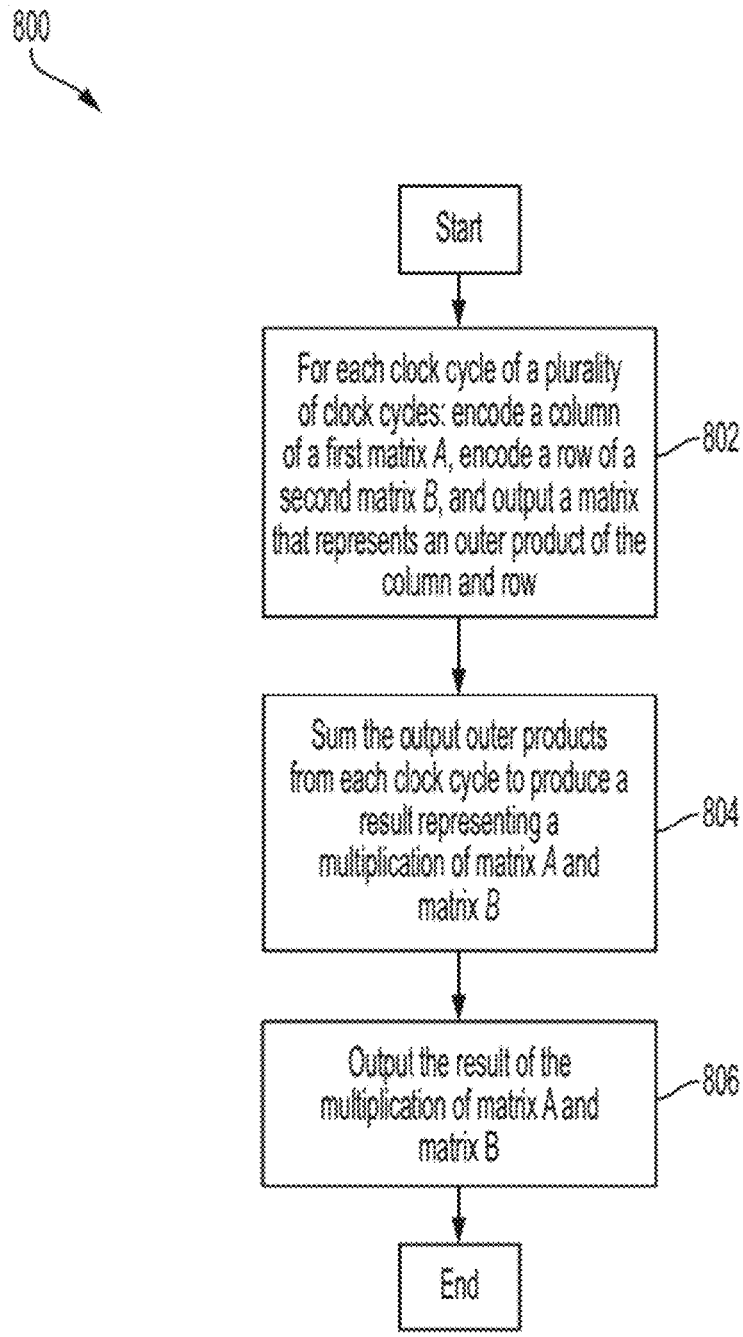
FIG. 8 is a flowchart illustrating a method of performing matrix multiplication using the photonic processor of FIG. 2 and using the method of FIG. 7, in accordance with some embodiments of the technology described herein.

FIG. 8 illustrates a method 800 of performing matrix-matrix and/or tensor multiplication operations using a photonic processor (e.g., the photonic processor of FIG. 2) and a method of calculating outer products (e.g., method 700 of FIG. 7), in accordance with some embodiments of the technology described herein.

In act 802, for every clock cycle of a plurality of clock cycles, a series of outer product operations may be performed, in accordance with some embodiments of the technology described herein. The operations may result in outputting, as a plurality of electrical signals, a matrix representing an outer product of a column vector and a row vector, the column vector and the row vector belonging to different matrices.

In some embodiments, the series of operations may be, for example, those performed in method 700 as described in connection with FIG. 7. That is, in act 802, a column of a first matrix A may be encoded in a plurality of optical signals using a first plurality of encoders, and a row of a second matrix B may be encoded in another plurality of optical signals using a second plurality of encoders. The encoded values of the column and row vector may be multiplied using a plurality of optical multiplication devices (e.g., detectors 208 of FIG. 2) adapted to output a plurality of electrical signals proportional to a product of a value of the column vector and a value of the row vector. The plurality of electrical signals may be output from the optical multiplication devices and may form a matrix that represents an outer product of the column vector and the row vector.

The output electrical signals from each clock cycle may be stored in a plurality of electrical storage devices, in accordance with some embodiments of the technology described herein. In act 804, after the plurality of clock cycles has been completed, the output electrical signals may be summed to produce a result representing a multiplication of matrix A and matrix B. The summation may be performed by, for example, accumulating, after each clock cycle, electrical signals representing different outer products in the electrical storage devices.

In act 806, the summed electrical signals representing a multiplication of the matrix A and matrix B may be output from the electrical storage devices, in accordance with some embodiments described herein. The output electrical signals may be output to, for example, a controller (e.g., controller 102 as described in connection with FIG. 1) to be stored in computer memory (e.g., memory 106) or used for further computational steps (e.g., performed on processor 104 or photonic processor 110). The output electrical signals may be output (e.g., as a bit string) to an external processor and/or memory system for further storage and/or computational steps.

Figure 9:
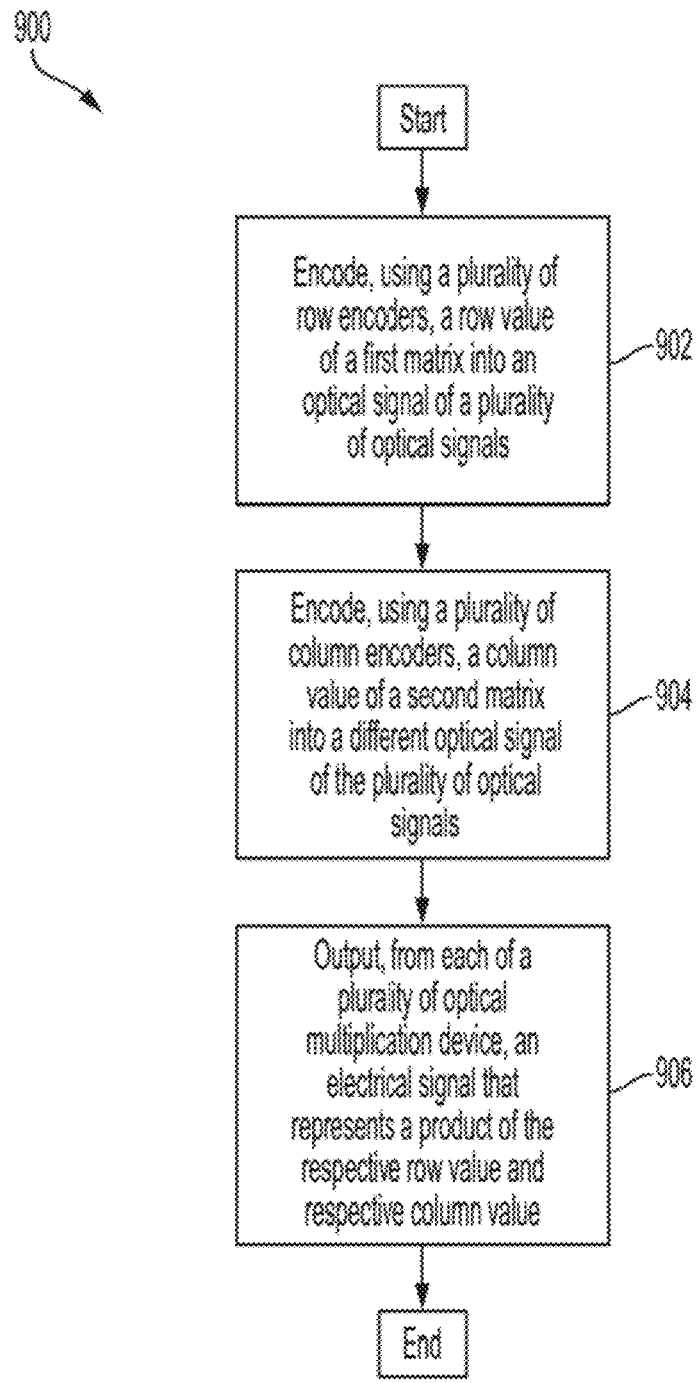
FIG. 9 is a flowchart illustrating a method of performing matrix multiplication using the photonic processor of FIG. 2, in accordance with some embodiments of the technology described herein.

FIG. 9 illustrates a method 900 of performing tensor multiplication using a photonic processor (e.g., photonic processor 200 of FIG. 2), in accordance with some embodiments of the technology described herein.

In act 902, a row value of a first matrix may be encoded into an optical signal of a plurality of optical signals, in accordance with some embodiments of the technology described herein. The row value may be encoded into the optical signal using, for example, an encoder such as encoder 202 as described in connection with FIG. 2. In some embodiments, the row value may be encoded into an amplitude and phase of the optical signal.

In act 904, a column value of a second matrix may be encoded into a different optical signal of a plurality of optical signals, in accordance with some embodiments of the technology described herein. The column value may be encoded into the different optical signal using, for example, an encoder such as encoder 202 as described in connection with FIG. 2. In some embodiments, the column value may be encoded into an amplitude and phase of the optical signal.

In some embodiments, the encoded row value and column value may then be output to an optical multiplication device (e.g., detectors 208 as described in connection with FIG. 2). In act 906, each optical multiplication device may output an electrical signal (e.g., a photocurrent) that represents a product of the respective row value and respective column value.

In some embodiments, the optical multiplication device may detect the optical signals from the row encoder and from the column encoder independently and may perform the multiplication using digital circuitry (e.g., one or more of an adder, a subtractor, a multiplier, and/or a divisor). In such embodiments, the output electrical signal will represent a product of the respective row value and respective column value in terms of a bit string.

Figure 10:
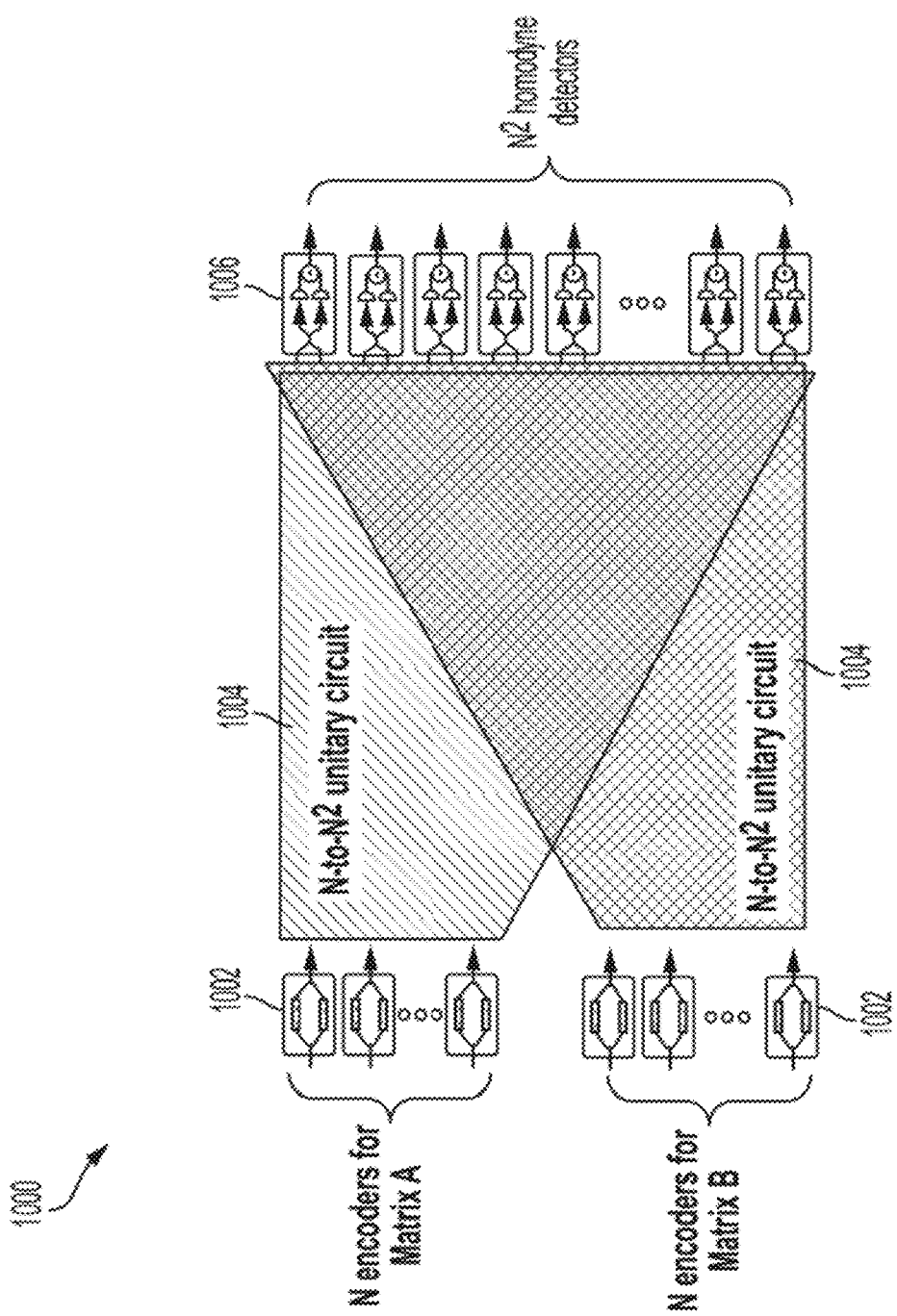
FIG. 10 is a schematic diagram of a generalized photonic processor, in accordance with some embodiments of the technology described herein.

FIG. 10 shows a schematic diagram of a generalized photonic processor 1000, in accordance with some embodiments of the technology described herein. In the generalized photonic processor 1000, the 2N copies of the 1-to-N splitters 204 of FIG. 2 may be replaced with two copies of an N-to-$N^2$ arbitrary unitary transformer 1004. The N-to-$N^2$ arbitrary unitary transformers 1004 may be built using, for example, an interconnected array of Mach-Zehnder interferometers.

In such embodiments, tensor multiplication operations are not the only operations that may be performed. In some embodiments, other mathematical operations that use data copying and multiplying-and-accumulating operations (e.g., convolutions, outer products, and/or tensor multiplications) may be performed without first converting the mathematical operations to tensor operations. Alternatively or additionally, it may be appreciated that a single 2N-to-$2N^2$ arbitrary unitary transformer may be used in place of N-to-$N^2$ arbitrary unitary transformer 1004, in some embodiments. In such embodiments, values from a first encoder may be multiplied with values from any other encoder, including values from the first encoder.

Figure 11:
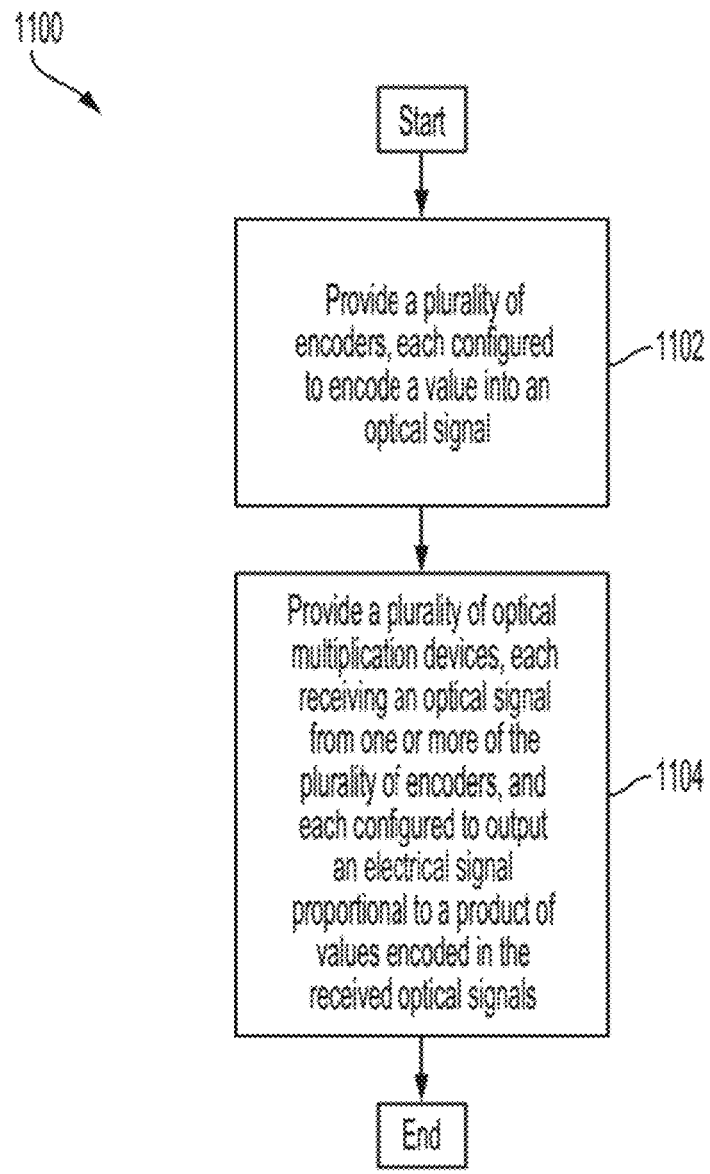
FIG. 11 is a flowchart illustrating a method of manufacturing a photonic processor, in accordance with some embodiments of the technology described herein.

FIG. 11 illustrates a method 1100 of manufacturing a photonic processor (e.g., photonic processor 200 and/or generalized photonic processor 1000), in accordance with some embodiments of the technology described herein.

In some embodiments, the method 1100 begins with act 1102, in which a plurality of encoders may be provided. The encoders may be configured to encode a value into an optical signal, as discussed herein in connection with encoders 202 of FIG. 2. In some embodiments, the encoders may be configured to encode the value into an amplitude and phase of the optical signal. In some embodiments, the encoders may include row encoders and column encoders arranged to perform tensor multiplication operations (e.g., as discussed in connection with photonic processor 200 of FIG. 2). In some embodiments, the encoders may not be configured so specifically (e.g., as discussed in connection with generalized photonic processor 1000 of FIG. 10).

Act 1102 may include providing the encoders on one or more semiconductor substrates (e.g., silicon substrates) using known semiconductor device fabrication techniques. In some embodiments, the encoders may be provided on a single substrate. In some embodiments, the encoders may be provided on two or more substrates. In such embodiments, the substrates may be connected using, for example, optical fiber techniques.

In act 1104, a plurality of optical multiplication devices may be provided, in accordance with some embodiments of the technology described herein. The optical multiplication devices may be coupled to one or more of the encoders provided in act 1102. Each optical multiplication device may output an electrical signal (e.g., a photocurrent) proportional to a product of the values received by the optical multiplication device from the one or more encoders. In such embodiments, the provided optical multiplication devices may be configured as homodyne detectors and/or heterodyne detectors.

In some embodiments, the optical multiplication devices may be, for example, detectors 208 as described in connection with FIG. 2. In such embodiments, the optical multiplication devices may each be coupled to a row encoder and a column encoder so that the optical multiplication device may output. In other embodiments, the optical multiplication devices may be, for example, detectors 1006 of photonic processor 1000 as described in connection with FIG. 10. In such embodiments, the provided optical multiplication devices may be coupled to any one or more of the encoders, including receiving multiple inputs from a single encoder.

In some embodiments, the optical multiplication devices may be provided on the same substrate as the encoders and the light sources. In such embodiments, the optical multiplication devices may be coupled to the encoders through one or more waveguides (e.g., silicon waveguides). The waveguides may be single-mode waveguides, though it is to be appreciated that imperfections during fabrication may yield waveguides that are not perfectly single-mode in nature. It may be appreciated that in such single substrate embodiments, the optical multiplication devices may be provided simultaneously or separately from the encoders (e.g., in a same or different fabrication step). It may further be appreciated that the optical multiplication devices may be provided in a same or different level of the substrate as the encoders.

In other embodiments, the optical multiplication devices may be provided on a different substrate from the encoders. In such embodiments, the optical multiplication devices may be coupled to the encoders using, for example, fiber optical techniques. Additionally, in such embodiments, the separate substrates may be mounted together into a single package using, for example, flip-chip bonding techniques or any other suitable packaging techniques. Similarly, the light sources may be located on the same substrate or a different substrate as the encoders. Similar packaging techniques, such as flip-chip bonding, edge coupling, or vertical coupling, may be used to package the substrates together.

Having thus described several aspects of at least one embodiment of this technology, it is to be appreciated that various alterations, modifications, and improvements will readily occur to those skilled in the art.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure described above. The computer-readable medium or media may be transportable, such that the program or programs stored thereon may be loaded onto one or more different computers or other processors to implement various aspects of the present disclosure as described above.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format. As another example, a computing device may receive input from a camera, lidar, or other device that produces visual data.

Embodiments of a computing device may also include a photonic processor, such as the one described herein. The processor of the computing device may send and receive information to the photonic processor via one or more interfaces. The information that is sent and received may include settings of the detectors of the photonic processor and/or measurement results from the detectors of the photonic processor.

The terms "program" or "software" are used herein to refer to any type of computer code or set of computer-executable instructions that may be employed to program one or more processors to implement various aspects of the present disclosure as described above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags, or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, examples of which are provided herein including with reference to FIGS. 6 and 7. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The terms "approximately" and "substantially" may be used to mean within ±20% of a target value in some embodiments, within ±10% of a target value in some embodiments, within ±5% of a target value in some embodiments, or within ±2% of a target value in some embodiments. The terms "approximately" and "substantially" may include the target value.

What is claimed is:

1. A method of performing matrix-matrix and/or tensor multiplication operations using a plurality of optical multiplication devices, the method comprising:
    for each clock cycle of a plurality of clock cycles:
        encoding, using a plurality of first encoders, a column of a first matrix into a first plurality of optical signals;
        encoding, using a plurality of second encoders, a row of a second matrix into a second plurality of optical signals; and
        accumulating, from the plurality of optical multiplication devices coupled to the plurality of first encoders and the plurality of second encoders, first electrical signals that represent a matrix comprising an outer product of the column and the row; and
    after the plurality of clock cycles, summing the accumulated first electrical signals to generate second electrical signals representing a product of the first matrix and the second matrix; and
    outputting the second electrical signals.

2. The method of claim 1, wherein accumulating the first electrical signals comprises accumulating the first electrical signals using one or more electrical storage devices.

3. The method of claim 2, further comprising outputting, from the one or more electrical storage devices, the second electrical signals representing the product of the first matrix and the second matrix.

4. The method of claim 1, wherein:
    encoding the column of the first matrix into the first plurality of optical signals comprises encoding each column value of the column of the first matrix onto an optical field of an optical signal of the first plurality of optical signals; and
    encoding the row of the second matrix into the second plurality of optical signals comprises encoding each row value of the row of the second matrix onto an optical field of an optical signal of the second plurality of optical signals.

5. The method of claim 1, wherein:
    encoding the column of the first matrix into the first plurality of optical signals comprises encoding each column value of the column of the first matrix into both an amplitude and a phase of an optical signal of the first plurality of optical signals; and
    encoding the row of the second matrix into the second plurality of optical signals comprises encoding each row value of the row of the second matrix into both an amplitude and a phase of an optical signal of the second plurality of optical signals.

6. The method of claim 1, wherein accumulating the first electrical signals comprises detecting, using a plurality of homodyne detectors, the encoded first plurality of optical signals output by the plurality of first encoders and the encoded second plurality of optical signals output by the plurality of second encoders.

7. The method of claim 6, further comprising phase shifting, using one or more phase shifters, the encoded first plurality of optical signals and the encoded second plurality of optical signals.

8. The method of claim 7, wherein phase shifting, using the one or more phase shifters, further comprises correcting for phase errors caused by one or more of differences in an optical path length to each optical multiplication device of the plurality of optical multiplication devices and/or temperature fluctuations.

9. The method of claim 7, wherein phase shifting, using the one or more phase shifters, further comprises encoding values as complex numbers.

10. The method of claim 7, wherein phase shifting, using the one or more phase shifters, further comprises encoding positive numbers with a first phase and negative numbers with a second phase having a π-phase difference with respect to the first phase.

11. At least one non-transitory computer-readable medium comprising instructions, which, when executed by an at least one photonic processor, cause the at least one photonic processor to perform a method of:
    for each clock cycle of a plurality of clock cycles:
        encoding, using a plurality of first encoders, a column of a first matrix into a first plurality of optical signals;
        encoding, using a plurality of second encoders, a row of a second matrix into a second plurality of optical signals; and
        accumulating, from a plurality of optical multiplication devices coupled to the plurality of first encoders and the plurality of second encoders, first electrical signals that represent a matrix comprising an outer product of the column and the row; and after the plurality of clock cycles, summing the accumulated first electrical signals to generate second electrical signals representing a product of the first matrix and the second matrix; and outputting the second electrical signals.

12. The at least one non-transitory computer-readable medium of claim 11, wherein accumulating the first electrical signals comprises accumulating the first electrical signals using one or more electrical storage devices.

13. The at least one non-transitory computer-readable medium of claim 12, further comprising outputting, from the one or more electrical storage devices, the second electrical signals representing the product of the first matrix and the second matrix.

14. The at least one non-transitory computer-readable medium of claim 11, wherein:

encoding the column of the first matrix into the first plurality of optical signals comprises encoding each column value of the column of the first matrix onto an optical field of an optical signal of the first plurality of optical signals; and encoding the row of the second matrix into the second plurality of optical signals comprises encoding each row value of the row of the second matrix onto an optical field of an optical signal of the second plurality of optical signals.

15. The at least one non-transitory computer-readable medium of claim 11, wherein:

encoding the column of the first matrix into the first plurality of optical signals comprises encoding each column value of the column of the first matrix into both an amplitude and a phase of an optical signal of the first plurality of optical signals; and encoding the row of the second matrix into the second plurality of optical signals comprises encoding each row value of the row of the second matrix into both an amplitude and a phase of an optical signal of the second plurality of optical signals.

16. The at least one non-transitory computer-readable medium of claim 11, wherein accumulating the first electrical signals comprises detecting, using a plurality of homodyne detectors, the encoded first plurality of optical signals output by the plurality of first encoders and the encoded second plurality of optical signals output by the plurality of second encoders.

17. The at least one non-transitory computer-readable medium of claim 16, further comprising phase shifting, using one or more phase shifters, the encoded first plurality of optical signals and the encoded second plurality of optical signals.

18. The at least one non-transitory computer-readable medium of claim 17, wherein phase shifting, using the one or more phase shifters, further comprises correcting for phase errors caused by one or more of differences in an optical path length to each optical multiplication device of the plurality of optical multiplication devices and/or temperature fluctuations.

19. The at least one non-transitory computer-readable medium of claim 17, wherein phase shifting, using the one or more phase shifters, further comprises encoding values as complex numbers.

20. The at least one non-transitory computer-readable medium of claim 17, wherein phase shifting, using the one or more phase shifters, further comprises encoding positive numbers with a first phase and negative numbers with a second phase having a π-phase difference with respect to the first phase.

* * * * *